June 23, 1953  R. B. CRONHEIM  2,643,024
VENTED COVER FOR COOKING VESSELS
Filed Nov. 28, 1952
FIG. 1.
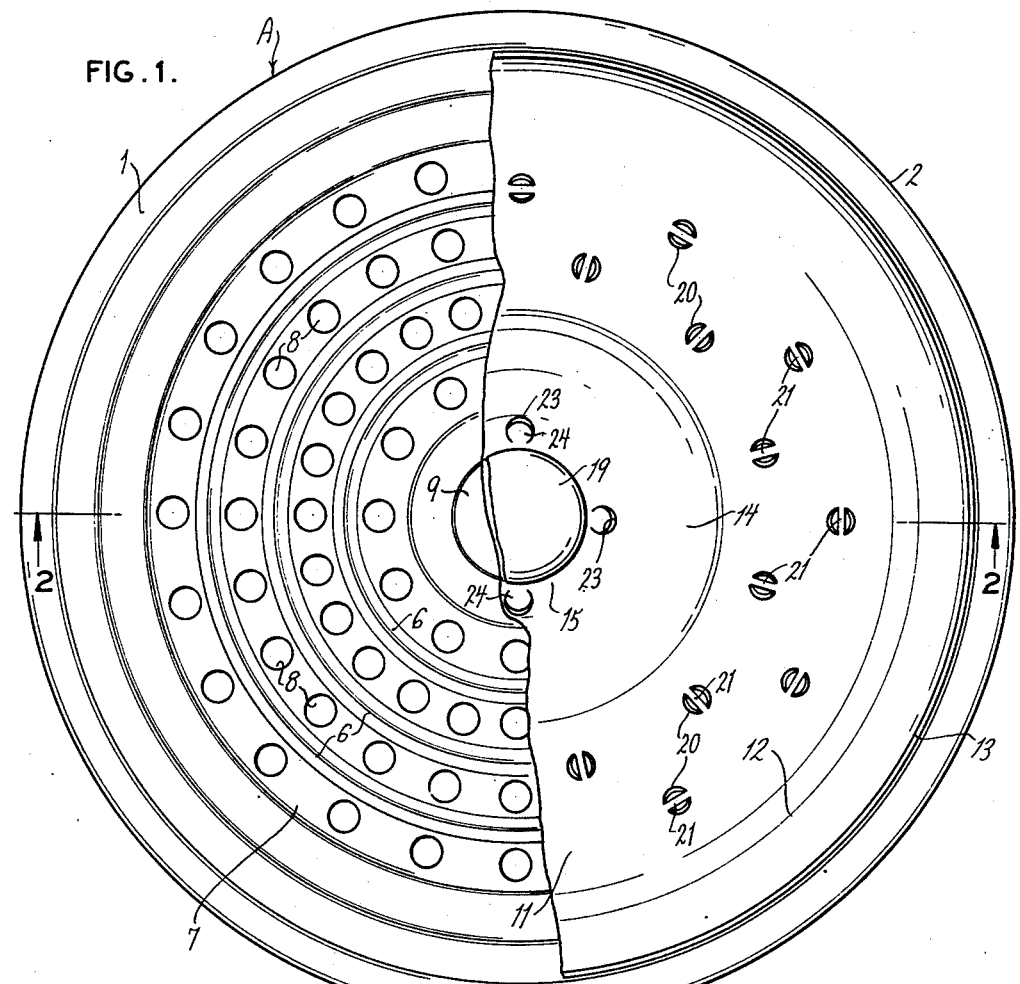
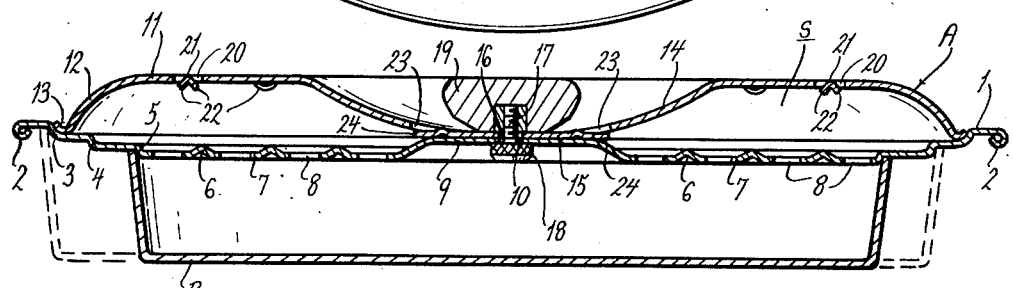
FIG. 2.
INVENTOR.
RICHARD B. CRONHEIM
BY
Alfred W. Petcheft
ATTORNEY Patented June 23, 1953

2,643,024

UNITED STATES PATENT OFFICE 2,643,024

VENTED COVER FOR COOKING VESSELS

Richard B. Cronheim, St. Louis, Mo.

Application November 28, 1952, Serial No. 323,077

2 Claims. (Cl. 220—44)

This invention relates in general to certain new and useful improvements in kitchen utensils and, more particularly, to a venting cover for a cooking vessel.

In the culinary art, it is quite frequently desirable to fry meat, vegetables and other food products in a well greased cooking utensil, such as a skillet or frying pan. In this type of cooking, the grease usually spatters upwardly and out of the pan, occasionally burning the person doing the cooking and frequently soiling the stove or near-by area of the wall in the kitchen. Occasionally the spattering is so violent that the grease will catch fire and cause considerable damage.

Ordinarily in preparing fried foods it is not possible to cover the frying pan or skillet because it is impossible to produce a crisply fried food product in a covered vessel. Most housewives, in an effort to produce an appetizing crispness in fried foods, feel that it is essential to use an uncovered cooking utensil for this purpose.

It is, therefore, the primary object of the present invention to provide a venting cover for a cooking vessel which is simple and economical in construction and will completely prevent any spattering of grease while at the same time permitting free and unimpeded dissipation of steam and the related gaseous products of the cooking operation, so that the resulting cooked food will be both crisp and appetizing.

It is another object of the present invention to provide a venting cover of the type stated which will fit cooking vessels of various different diametrical sizes.

It is an additional object of the present invention to provide a venting cover of the type stated which may be very quickly and simply disassembled and reassembled for convenience in washing and cleaning.

With the above and other objects in view, my invention resides in the novel features of form, construction, arrangement, and combination of parts presently described and pointed out in the claims.

In the accompanying drawing—

Figure 1 is a top plan view, partly broken away and in section, of a venting cover constructed in accordance with and embodying the present invention; and Figure 2 is a transverse sectional view taken along line 2—2 of Figure 1.

Referring now in more detail and by reference characters to the drawing, which illustrates a preferred embodiment of the present invention, A designates a venting cooking cover comprising a substantially circular bottom plate or base disk 1 pressed or otherwise formed from sheet aluminum or other suitable material having a downwardly curled peripheral rim 2 and being provided inwardly of the rim 2 with a series of concentric step-like ledges 3, 4, 5, adapted, respectively, to fit within the upper peripheral margin of a conventional frying pan B, as shown in full lines in Figure 2. For purposes of illustration, a somewhat larger frying pan has been schematically illustrated in dotted lines in Figure 2 and it should be understood in this connection that frying pans of intermediate size may also be utilized and will either engage snugly against one of the ledges 3, 4, 5, or abut against the flat areas therebetween.

Interiorly of the ledge 5, the base disk 1 is provided with a uniformly spaced series of concentric upwardly pressed corrugations 6 having intermediate annular flat areas 7 which are provided with circular apertures 8. By referring to Figure 1 it will be noted that the apertures 8 in one of the flat areas 7 are radially aligned with corresponding apertures 8 in the other flat areas 7 so that the apertures 8 are aligned very much like the spokes of a wheel. In its central area, the base disk 1 is dished upwardly to provide a flat topped central protuberance 9 which is, in turn, provided with a central aperture 10.

Provided for co-operation with the base disk 1 is a top member or dome 11 also pressed or otherwise formed from sheet aluminum or other suitable material and having a deeply drawn downwardly curved flange 12 terminating in an upwardly curved semi-circular peripheral rim 13 shaped to fit snugly within the upwardly presented curve of the ledge 3. In its central area the dome 11 is concavely dished or pressed downwardly to form a bowl-shaped central depression or recess 14, the interior portion of which is flattened, as at 15, to rest flatwise upon the upper face of the protuberance 9 of the base disk 1. Centrally of the flattened portion 15, the dome 11 is provided with an aperture 16 adapted for registration with the aperture 10 of the base disk 1 for receiving and loosely accommodating a short bolt 17 having a diametrally enlarged knurled head 18 and adapted for threaded engagement within a relatively large handle-forming knob 19, the upper face of which is flattened to lie substantially in the plane of the top surface of the dome 11, substantially as shown in Figure 2. In its upper area, the dome 11 is provided with an annularly arranged staggered series of apertures 20 which are only partially stamped and are, in effect, connected by thin diametral filaments 21 having angularly downwardly punched arcuate flanges 22. It will be noted by reference to Figure 1 that the filaments 21 of the outer annular ring of apertures 20 are oriented approximately at 90° to the direction of the filament 21 of the inner ring of apertures 20 and it will also be evident that the apertures 20 are located directly above the corrugations 6 so that none of the apertures 8 in the base disk 1 will be in vertical alignment with any of the apertures 20 of the dome 11. Finally, the flattened portion 15 of the bowl-shaped depression 14 is provided with a plurality of partially struck out apertures 23 having angularly downwardly and inwardly deflected tongues 24.

When in use, the spatter-proof cover A may be placed over the frying pan B, as shown in Figure 2, and the steam, water vapor and other gaseous products of cooking will freely circulate through the aperture 8 into the annular space s between the base disk 1 and the dome 11 and thence circulate upwardly and outwardly through the apertures 20 of the dome 11. Liquid globules of spattering grease, however, which must necessarily travel in a substantially straight line or at least along a defined trajectory, will, for the most part, be deflected back into the frying pan B by the under surfaces of the base disk 1. Obviously, some of these flying grease particles will pass through the apertures 8 along angular paths, but in traveling along such angular paths will not be able to also pass through any of the apertures 20 and will thus fall down through the space s onto the upper surface of the base disk 1 and ultimately drain back into the frying pan B through the apertures 8. When the user desires to add water to the skillet during the course of cooking, as is frequently considered necessary, it is possible to do so very quickly and conveniently without removing the venting cover A by pouring the water into the depression 14 whence it will drain through the aperture 23 and the apertures 8 into the interior of the frying pan B. The agitated spattering of grease which invariably results from the addition of liquids to the contents of a hot frying pan will, of course, be held within the frying pan and prevented from flying upwardly and outwardly to damage the walls, harm the cook and create a fire hazard.

After the cooking operations have been concluded, the venting cover A may be very simply washed and cleansed by unscrewing the handle-forming knob 19 and separating the base disk 1 from the dome 11 so that the two components can be separately washed, dried, and put back together again.

It should be understood that changes and modifications in the form, construction, arrangement, and combination of the several parts of the venting covers for cooking vessels may be made and substituted for those herein shown and described without departing from the nature and principle of my invention.

Having thus described my invention, what I claim and desire to secure by Letters Patent is:

1. A venting cover for a cooking utensil comprising a bottom member including a raised central portion, an intermediate portion having apertures therein, and a marginal portion adapted to engage a cooking utensil, a top member including a depressed central portion engaging the central portion of said bottom member, said depressed central portion having an aperture in the bottom thereof positioned outwardly of the central portion of said bottom member to allow fluid poured into the depressed central portion of the top member to flow into the utensil, an intermediate portion spaced from said bottom member and having apertures therein arranged out of alignment with the apertures in said bottom member, and a marginal portion engaging the marginal portion of said bottom member, and means extending through said central portions for securing said top and bottom members together.

2. A venting cover for cooking utensils comprising a bottom member adapted to engage the peripheral margins of the cooking utensil and extending closurewise thereacross, said bottom member having a concentric substantially flat portion provided with a plurality of spaced concentric annular corrugations, each of the annular spaces between adjacent corrugations being provided with a series of annularly spaced apertures, a top member extending over and across the bottom member and being in engagement therewith around its periphery, said bottom and top members being spaced away from each other through substantial portions of their overlying areas, said top member having a depressed central portion in facewise abutting contact with the bottom member thereby defining an annular enclosed space between the top and bottom members, handle means extending upwardly from the top member, and fastening means extending through the bottom member and releasably engaged with the handle means for holding said top and bottom members detachably together, said top member further being provided, in that portion of its area which is in upwardly spaced relation to the bottom member, with a plurality of annularly spaced apertures located out of overlying alignment with the apertures in the bottom member, said depressed portion in the top member forming a concentrically rimmed well, said well being provided with aperture means communicating to the interior of the enclosed space between said top and bottom members, said bottom member further being provided with aperture means adjacent its central portion and out of alignment with the aperture means of the top member, whereby to permit liquids to be poured into said well and thence through said aperture means of the top and bottom members into the utensil.

RICHARD B. CRONHEIM.

References Cited in the file of this patent

UNITED STATES PATENTS

| Number | Name | Date |
|---|---|---|
| 626,808 | Gurney | June 13, 1899 |
| 1,676,146 | Krafft | July 3, 1928 |
| 2,114,823 | Toscano | Apr. 19, 1938 |
| 2,348,452 | Christopher | May 9, 1944 |
| 2,511,682 | Allen | June 13, 1950 |
| 2,609,960 | Irwin | Sept. 9, 1952 |